United States Patent [19]
Gretz et al.

[11] Patent Number: 5,939,680
[45] Date of Patent: Aug. 17, 1999

[54] ARCUATE CABLE SUPPORT

[75] Inventors: Thomas J. Gretz, Clarks Summit, Pa.; Thomas S. Stark, Coral Springs, Fla.; Martin Frederick Delmore, Clarks Summit, Pa.

[73] Assignee: Arlington Industries, Inc., Scranton, Pa.

[21] Appl. No.: 08/866,985

[22] Filed: Jun. 2, 1997

[51] Int. Cl.⁶ .................................................... H01B 7/00
[52] U.S. Cl. ............................................. 174/135; 248/49
[58] Field of Search ................... 174/135, 68.1; 248/49, 53, 63

[56] References Cited

U.S. PATENT DOCUMENTS

| | | | |
|---|---|---|---|
| 851,375 | 4/1907 | Raymond | 248/49 |
| 1,884,036 | 10/1932 | Malone | 248/63 |
| 2,402,408 | 6/1946 | Johnston | 248/49 |
| 2,858,590 | 11/1958 | Koch | 24/129 B |
| 5,399,814 | 3/1995 | Staber et al. | 174/135 |

*Primary Examiner*—Clayton LaBalle
*Assistant Examiner*—Joseph Waks

[57] ABSTRACT

A cable support device includes an arcuate mold having a cable channel with two ends for receiving an electrical cable and guiding the electrical cable around a ninety degree curve, the arcuate mold having an inner surface extending the full length of the arcuate mold and a partial outer surface located at each of the two ends of the arcuate mold. Retention clips having protrusions located opposite each other on the inner surface and the outer surface are positioned in the cable channel for holding the electrical cable in place. Inner and outer intermediate fastener guides having stepped members on either side of the arcuate mold are positioned on the arcuate mold to permit stacking of a plurality of arcuate molds. Fastener guides are provided at both ends of the arcuate mold to permit vertical to horizontal transitions.

2 Claims, 3 Drawing Sheets

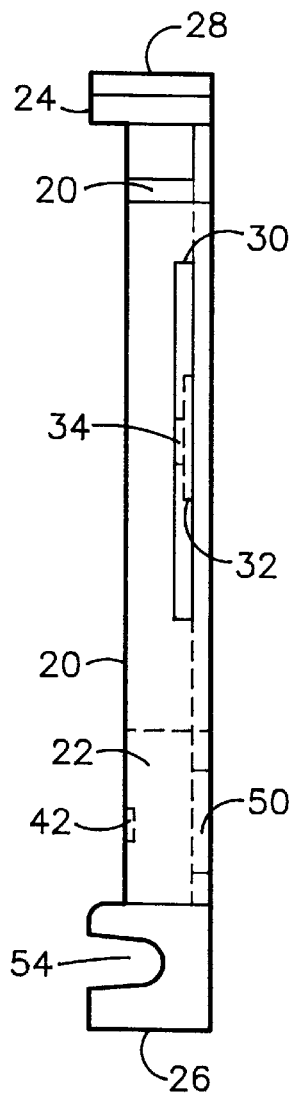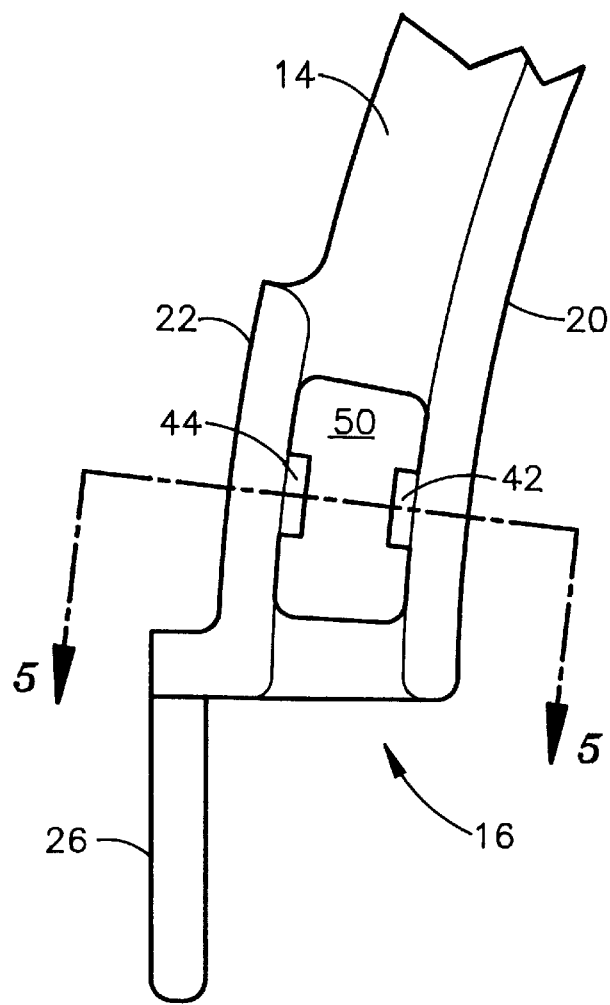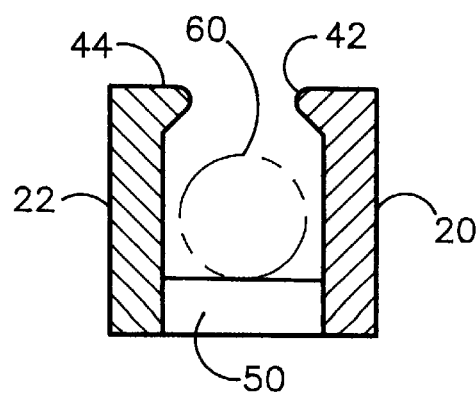
FIG. 3
FIG. 4
FIG. 5

ARCUATE CABLE SUPPORT

BACKGROUND OF THE INVENTION

1. Field of the Invention

The present invention pertains to cable supports and more particularly to cable supports for locations where cables make a ninety degree change of direction and a plurality of cables may be running parallel at the same location.

2. Related Prior Art

In present day technology cables or wires are used extensively with many hard wired applications. There is a constant problem of making turns or change of direction with the cables and maintaining order in the cables. Maintaining order is important so that if any problem occurs in one of the cables, the cable may be physically followed. Thus, the problem may be easily located if the problem is a break. If the problem is not visually discernable, the entire cable under suspect may be replaced.

There are several methods for maintaining cable position through changes in direction for a plurality of cables along with their relative position with respect to each other. The following United States patents are representative of the state of the art.

U.S. Pat. No. 2,530,812, titled "Supporting Detail For Flexible Conductors", issued to B. H. Carmer, Jr., et al., relates to a supporting detail or guide in the form of a fiber tube precurved in accordance with the minimum radius of curvature considered permissible for the particular conductor with which it is intended to be used. The tube is split longitudinally along the entire length of its periphery the slit being widened or flared for a short distance at each end. The formed tube is resistant to forces acting in a direction tending to change its arcuate radius but offers only a yielding resistance to forces applied in a direction tending to widen the slit. In application to a conductor, the conductor is forced sideways in through the slit, the flared end portions facilitating initial entry of the conductor. After positioning on the conductor, the tube resumes its normal closed position wherein it fits snugly around the conductor with its edges of the slit separated by only a short distance. The conductor assumes the curvature of the tube the arcuate radius of which is sufficiently large to assure avoidance of trouble due to cold flow of the insulation.

U.S. Pat. No. 4,781,255, titled "Cable Conduit System For Vehicles", issued to Stanley A. Lock, et al., relates to a conduit system adapted for mounting in a vehicle including constant cross-sectional elongate conduit elements, having one or more channels formed therein, and retention and locking members for holding the cables within each channel at intervals along their lengths. The conduit system may comprise a plurality of straight conduit elements connected end to end, for example, in an aircraft fuselage. Alternatively, where a change of direction and/or elevation is necessary, the straight conduit elements may be interconnected by curved joining conduit elements.

U.S. Pat. No. 5,039,828, titled "Wire Harness Protector And Pivotable Door Assembly Including Same", issued to Larry D. Marks, et al., relates to a wire harness protector for use in an appliance. The wire harness protector consists of two members. A first member is secured to the door so as to pivot therewith. A second member is also secured to the door but remains stationary when the door is pivoted. Thus, when the door is pivoted, the second member is fixed relative to the door support structure and the first member pivots with the door. Both the first member and the second member include conduits which are aligned with the hinge axis of the door. Each of the first and second members forms an enclosure for enclosing and routing the wire harness. The conduits are formed by U-shaped channels and covers therefor. The covers are held in place by means of locking snaps. The entire first and second members may each be formed in a single integral molding process from a thermoplastic material such as a fire retardant polypropylene. In an alternative embodiment, the first member may be formed of a shallow U-shaped channel and the wire harness may be secured inside the channel by means of adhesive tape so that the wires are secured in predetermined positions within the U-shaped channel.

U.S. Pat. No. 5,399,812, titled "Housing For Supporting and Routing Cables", issued to Dale M. Woszczyna, et al., relates to a housing for supporting a plurality of cables in which separate channels are formed in the housing. Each channel is defined by a pair of side walls at least one of which is provided with flexible tab members. These flexible tab members have a detent device that cooperate with a similar detent device formed on the opposing wall for retaining cable within an associated channel.

Each of these foregoing patents represent attempts to solve problems involving cables or wires traveling from one location to another where a change of direction may be necessary. None of the prior art solves the problem of guaranteeing the proper radius of curvature for a cable and is versatile enough to permit securely anchoring one or any number of cables individually at one location while preserving the integrity of individual cable lines.

SUMMARY OF THE INVENTION

The present invention provides a cable support device that includes an arcuate mold having an indentation or cable channel for receiving an electrical cable and holding it in position. The cable support device guides the electrical cable around a ninety degree curve. The cable support device has fastener guides at both arcuate ends, with inner and outer intermediate fastener guides, retention clips in the cable channel and a stepped profile to permit stacking of arcuate cable supports.

The cable support device of the present invention includes an arcuate mold having a cable channel with two ends having sides extending up from a base for receiving an electrical cable and guiding said electrical cable around a ninety degree curve. The arcuate mold has an inner wall stretching up from the base that extends the full length of the arcuate mold and a partial outer wall stretching up from the outer edge of the base opposite the inner wall and extending along only a portion of the arcuate mold. The outer wall is located at each of the two ends of the arcuate mold. In this manner, cost savings can be realized through the use of less materials while providing the necessary integrity to guide a cable around a turn.

Further, the partial walls provide a source for a part of a retention clip to hold the cable in place. Protrusions located opposite each other on the inner wall and the outer wall act as retention clips and are positioned in the cable channel for holding the electrical cable in place. Inner and outer intermediate fastener guides having stepped members on either side of the arcuate mold are positioned to permit stacking of a plurality of arcuate molds. Fastener guides are provided at both ends of the arcuate mold to permit vertical to horizontal transitions.

BRIEF DESCRIPTION OF THE DRAWINGS

FIG. 3 is a side view of the cable support device of FIG. 1 taken along lines 3—3.

FIG. 4 is an enlarged portion of the top view of the cable support device of FIG. 1.

FIG. 5 is a sectional view of the cable support device of FIG. 4 taken along lines 5—5.

DESCRIPTION OF THE PREFERRED EMBODIMENT

As stated previously, present day technology uses cables or wires extensively in most hard wired applications. A constant problem occurs in making turns or change of direction while maintaining order in the cables. Maintaining order is important to permit locating problems in a specific cable that may be visually discernable and allowing easy replacement of the problem cable without requiring replacement of an entire bundle.

Prior art solves the problem of guaranteeing the proper radius of curvature for a cables or wires traveling from one location to another where a change of direction may be necessary while being versatile enough to permit securely anchoring one or any number of cables individually at one location while preserving the integrity of individual cable lines.

The present invention provides a cable support device that includes an arcuate mold defining a cable channel for receiving and guiding an electrical cable around a ninety degree curve. The arcuate mold has an inner surface that extends the full length of the arcuate mold and a partial outer surface located at each of the two ends of the arcuate mold.

Retention clips having protrusions located opposite each other on the inner surface and the outer surface are positioned in the cable channel for holding the electrical cable in place. Inner and outer intermediate fastener guides are positioned on either side of the arcuate mold. The intermediate fastener guides are configured in a stepped arrangement to permit stacking of a plurality of arcuate molds.

Fastener guides are provided at both ends of the arcuate mold to permit vertical to horizontal transitions. These fastener guides are stepped extensions of the side walls and includes a rounded notch for receiving and guiding fasteners such as nails or screws.

Figure 1:
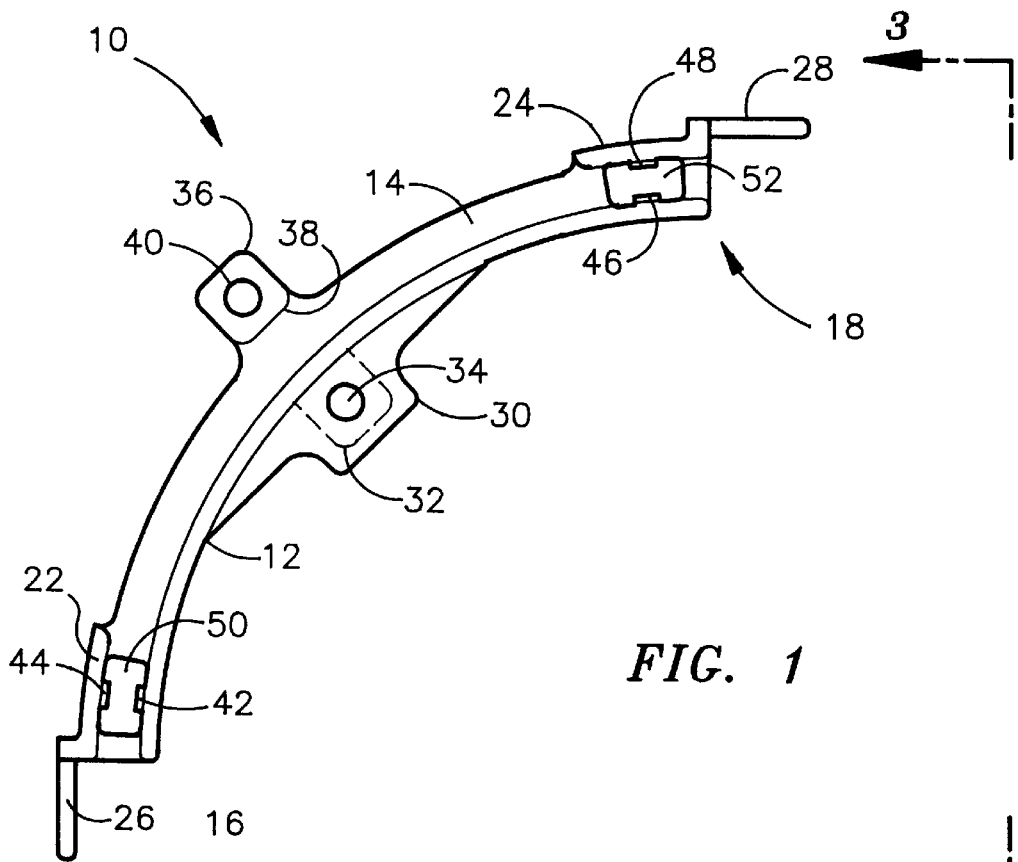
FIG. 1 is a top view of a cable support device.

Referring now to FIG. 1, a top view of a cable support device 10 of the present invention is illustrated as an arcuate mold 12 defining a cable channel 14 having ends 16 and 18 with an inner wall 20 extending the full length of arcuate mold 12 and outer walls 22 and 24 located at the ends of arcuate mold 12. In the preferred embodiment of the present invention, the diameter of arcuate mold 12 is two and one half inches. This is the standard radius of curvature for ninety degree turns, however, different radii of curvature may be used without departing from the scope of the present invention.

Connected to outer walls 22 and 24 are fasteners 26 and 28 respectively. Extending from inner wall 20 is intermediate fastener guide 30 having a generally rectangular indentation 32 with a circular hole 34 approximately at the center of indentation 32. Extending outwardly from arcuate mold 12 is intermediate fastener guide 36 having a generally rectangular protrusion 38 extending upwardly with a circular hole 40 approximately at its center.

Rectangular indentation 32 is formed to receive rectangular protrusion 38 and approximately the same size and orientation as rectangular protrusion 38. Indentation 32 and protrusion 38 may be any shape and size, as long as protrusion 38 fits snugly into indentation 32 to align a plurality of cable guides 10.

At end 16 are extensions 42 and 44 located on inner wall 20 and outer wall 22 respectively. At end 18 are extensions 46 and 48 located on inner wall 20 and outer wall 24 respectively. Extensions 42 and 44 are located opposite each other on inner wall 20 and outer wall 22 and directly above and generally centered on elongated orifice 50. Extensions 42 and 44 cooperate with orifice 50 and act as a retention clip to hold a cable on place in channel 14 at end 16 when inserted into arcuate mold 12. Similarly, extensions 46 and 48 are located opposite each other on inner wall 20 and outer wall 24 and directly above elongated orifice 52. Extensions 46 and 48 cooperate with orifice 52 and act as a retention clip to hold a cable on place in channel 14 at end 18 when inserted into arcuate mold 12.

Figure 2:
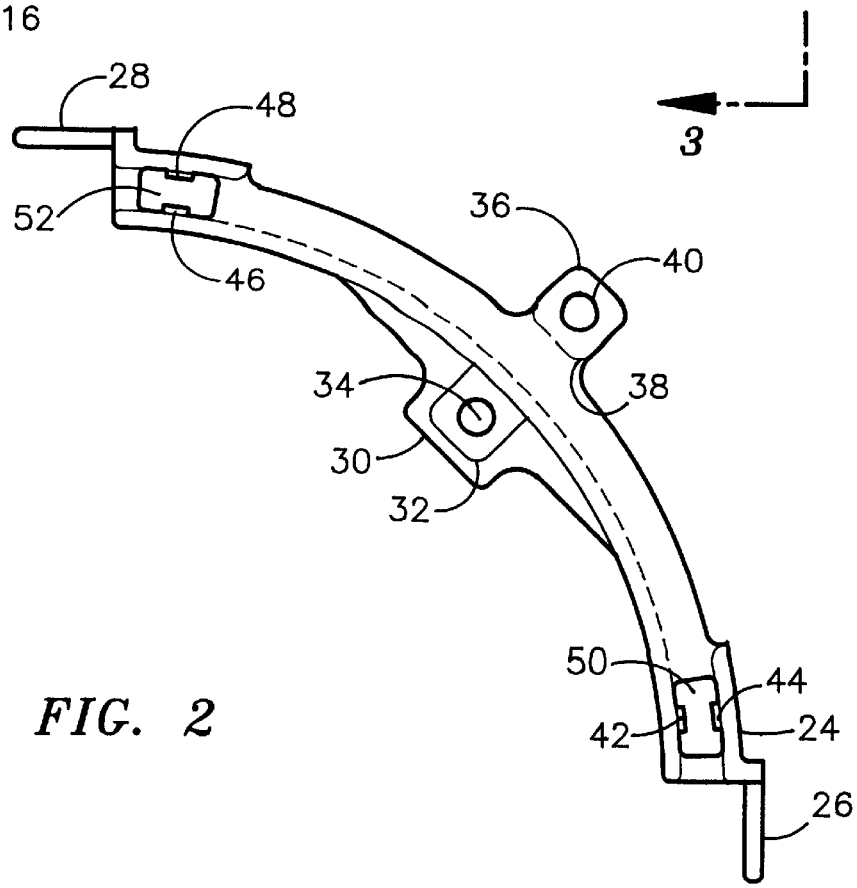
FIG. 2 is a bottom view of the cable support device of FIG. 1.

FIG. 2 is a bottom plan view of cable support device 10 of FIG. 1. The view of FIG. 2 better illustrates holes 34 and 40, indentation 32 and elongated orifices 50 and 52.

FIG. 3 is a side plan view of cable support device 10 taken along lines 3—3 of FIG. 1. Fastener guide 26 is illustrated as having an rounded notch 54 for receiving and guiding either a screw or nail or the like for fastening cable support device 10. Similarly, fastener guide 28 has a rounded notch 56 (see FIG. 7) for receiving and guiding either a screw or nail or the like for fastening cable support device 10.

FIG. 4 is an enlarged view of end 16 of cable support device 10 of FIG. 1. This view more clearly illustrates elongated, generally rectangular orifice 50 having extensions 42 and 44 located on opposite sides of orifice 50 on inner wall 20 and outer wall 22 respectively. Extensions 42 and 44 are located opposite each other on inner wall 20 and outer wall 22 and directly above and generally centered on elongated orifice 50. As stated previously, extensions 42 and 44 cooperate with orifice 50 and act as a retention clip to hold a cable in place that is being guided and held in position in arcuate mold 12.

FIG. 5 is a side sectional view taken along lines 5—5 of FIG. 4. In this view, extensions 42 and 44 are more clearly illustrated as extensions of inner wall 20 and outer wall 22. A side view of a cable 60 is illustrated in phantom showing that the diameter of cable 60 is greater than the distance between extension 42 and extension 44.

Arcuate mold is preferably made of a high strength plastic and has a certain amount of flex to permit expansion while cable 60 is being inserted. In this manner, cable 60 is inserted in channel 14 taking advantage of the flex in inner wall 20 and outer wall 22, allowing extensions 42 and 44 to push outwardly. Once cable 60 is in place, extensions 42 and 44 return to their normal positions, locking cable 60 in position, forcing it slightly down into orifice 50.

Figure 6:
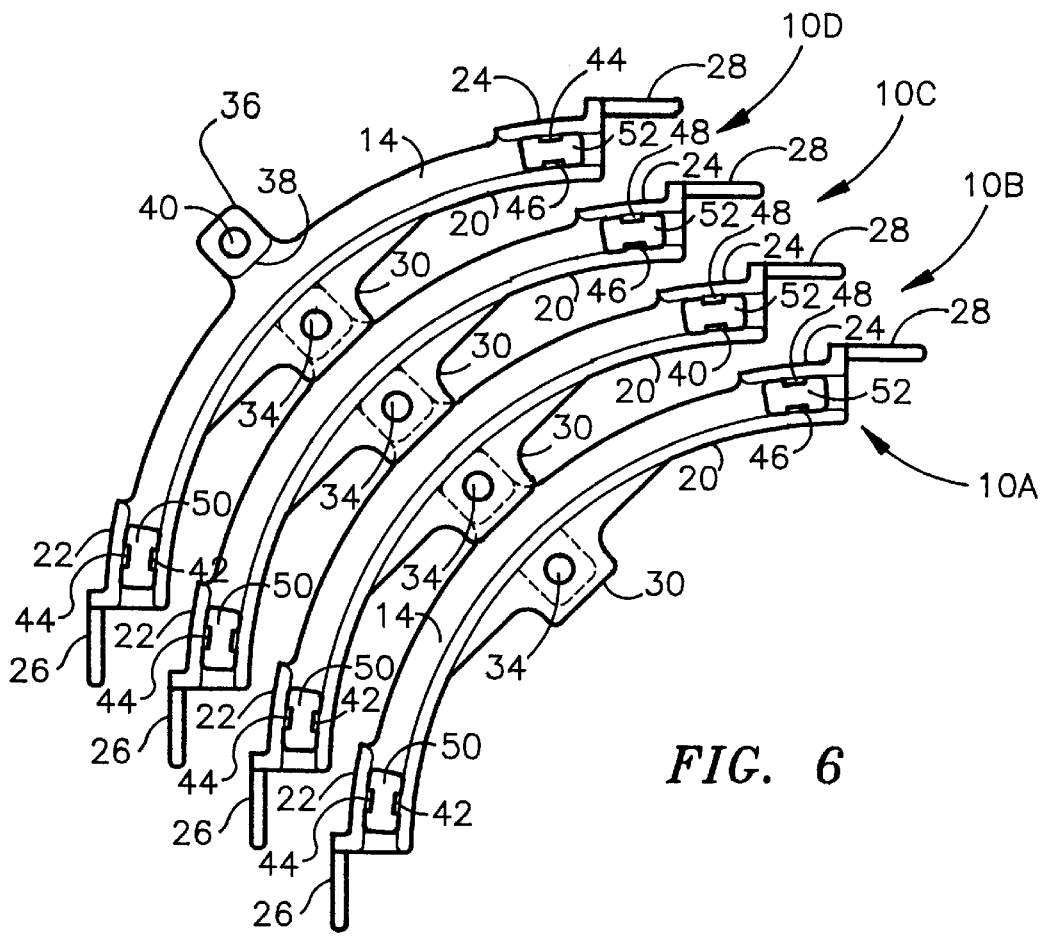
FIG. 6 is a top view of a plurality of cable support devices of FIG. 1 stacked together.

FIG. 6 illustrates how several cable support devices 10A through 10D may be used together. Fastener guide 30 of cable support device 10A may be set in place either by a nail or a screw. Fastener guide 30 of cable support device 10B is inserted under fastener guide 36 of cable support device 10A. A screw or nail is then inserted into hole 34 of fastener guide 30 in cable support device 10B and travels through hole 40 of fastener guide 36 in cable support device 10A. Similarly, fastener guide 30 of cable support device 10C is inserted under fastener guide 36 of cable support device 10B. A screw or nail is then inserted into hole 34 of fastener guide 30 in cable support device 10C and travels through hole 40 of fastener guide 36 cable support device 10B. Finally, fastener guide 30 of cable support device 10D is inserted under fastener guide 36 of cable support device 10C. A screw or nail is then inserted into hole 34 of fastener guide 30 in cable support device 10D and travels through hole 40 of fastener guide 36 cable support device 10C.

Figure 7:
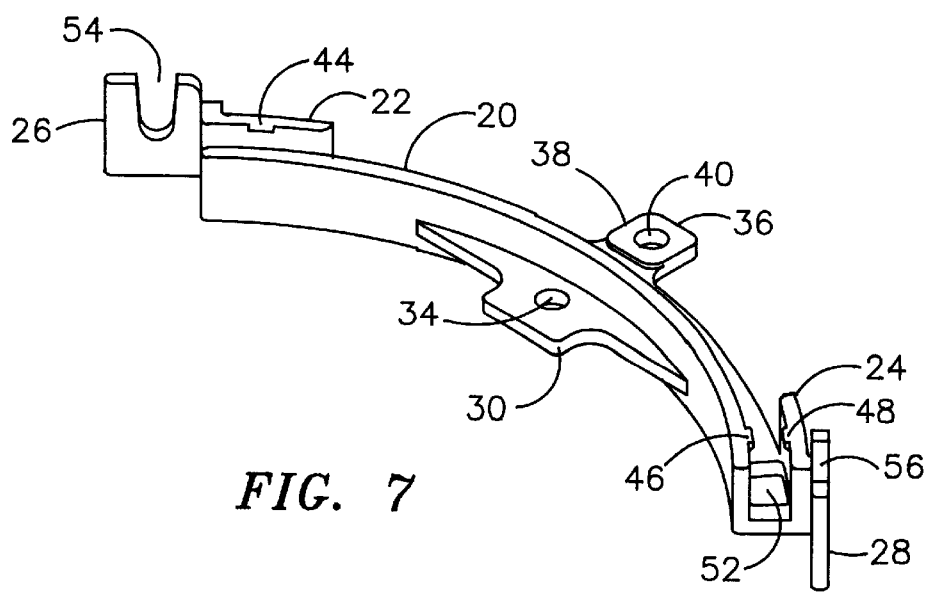
FIG. 7 is an isometric view of the cable support device of FIG. 1.

FIG. 7 is an isometric view of cable support device 10 of FIG. 1. This view more clearly illustrates the relationship of fastener guide 30 and fastener guide 36. Also illustrated more clearly is the relationship between extension 46, extension 48 and orifice 52. Fastener guides 26 and 28 with their rounded notches 54 and 56 are illustrated.

The cable support device of the present invention includes an arcuate mold having a cable channel with two ends having sides extending up from a base for receiving an electrical cable and guiding said electrical cable around a ninety degree curve. The arcuate mold has an inner wall stretching up from the base that extends the full length of the arcuate mold and a partial outer wall stretching up from the outer edge of the base opposite the inner wall and extending along only a portion of the arcuate mold, the outer wall being located at each of the two ends of the arcuate mold. Protrusions located opposite each other on the inner wall and the outer wall act as retention clips and are positioned in the cable channel for holding the electrical cable in place. Inner and outer intermediate fastener guides having stepped members on either side of the arcuate mold are positioned to permit stacking of a plurality of arcuate molds. Fastener guides are provided at both ends of the arcuate mold to permit vertical to horizontal transitions.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A one piece support device comprising:

an arcuate mold having a cable channel with two ends for receiving a cable and guiding said cable around a ninety degree curve;

integral retention clips located in said cable channel for holding the cable in place;

and inner and outer intermediate fastener guides positioned on said arcuate mold which includes a protrusion and an indentation on said intermediate fastener guides to permit stacking of a plurality of said arcuate molds.

2. A method for supporting a conductor comprising:

receiving a cable and guiding said cable around a ninety degree curve with an arcuate mold having a cable channel with two ends;

holding said cable in place with retention clips located in said cable channel; and aligning the position of the arcuate mold using inner and outer intermediate cable fastener guide positioned on the arcuate mold which includes stacking adjacent arcuate molds by using a protrusion and an indentation on said intermediate fastener guides.

* * * * *